(12) United States Patent
Gomadam

(10) Patent No.: US 9,769,679 B2
(45) Date of Patent: Sep. 19, 2017

(54) EFFICIENT LINK ADAPTATION FOR NON-COLLOCATED ANTENNAS

(71) Applicant: Avago Technologies General IP (Singapore) Pte. Ltd., Singapore (SG)

(72) Inventor: Krishna Srikanth Gomadam, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 399 days.

(21) Appl. No.: 14/137,324

(22) Filed: Dec. 20, 2013

(65) Prior Publication Data

US 2014/0185476 A1    Jul. 3, 2014

Related U.S. Application Data

(60) Provisional application No. 61/747,917, filed on Dec. 31, 2012.

(51) Int. Cl.
*H04W 24/02*  (2009.01)
*H04B 7/024*  (2017.01)
*H04L 1/00*   (2006.01)

(52) U.S. Cl.
CPC .......... *H04W 24/02* (2013.01); *H04B 7/024* (2013.01); *H04L 1/0031* (2013.01); *H04L 1/0026* (2013.01)

(58) Field of Classification Search
None
See application file for complete search history.

(56) References Cited

U.S. PATENT DOCUMENTS

| | | | |
|---|---|---|---|
| 2011/0243018 A1* | 10/2011 | Prasad et al. | 370/252 |
| 2012/0082192 A1* | 4/2012 | Pelletier et al. | 375/219 |
| 2012/0099666 A1* | 4/2012 | Baldemair | H04B 7/0623 375/260 |
| 2012/0213261 A1* | 8/2012 | Sayana et al. | 375/224 |

* cited by examiner

*Primary Examiner* — Rhonda Murphy
(74) *Attorney, Agent, or Firm* — Sterne, Kessler, Goldstein & Fox P.L.L.C.

(57) ABSTRACT

Systems and methods for efficient link adaptation in multi-access wireless communication networks, including link adaptation in scenarios with non-collocated and/or power imbalanced base station transmit antennas are provided. In an embodiment, an indication of signal powers of the transmit antennas is signaled by the network to the user equipment (UE) when the UE is configured for logical antenna ports using non-collocated and/or power imbalanced transmit antennas. The UE can use the indication of signal powers in determining the Precoding Matrix Indicator (PMI) and the Channel Quality Indicator (CQI), resulting in higher accuracy link adaptation.

20 Claims, 4 Drawing Sheets

EFFICIENT LINK ADAPTATION FOR NON-COLLOCATED ANTENNAS

CROSS-REFERENCE TO RELATED APPLICATION(S)

The present application claims the benefit of U.S. Provisional Application No. 61/747,917, filed Dec. 31, 2012, which is incorporated herein by reference in its entirety.

BACKGROUND

Technical Field

The present disclosure relates generally to link adaptation in multi-access wireless communication networks, including link adaptation with non-collocated base station antennas.

Background Art

Current cellular technology standards support various multi-transmit antenna configurations, in which a user equipment (UE) can receive simultaneous transmissions from multiple transmit antennas of the network. The multiple transmit antennas can be located at the same or different geographic locations.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person Skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

For purposes of this discussion, the term "module" shall be understood to include at least one of software, firmware, and hardware (such as one or more circuits, microchips, processors, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

Figure 1:
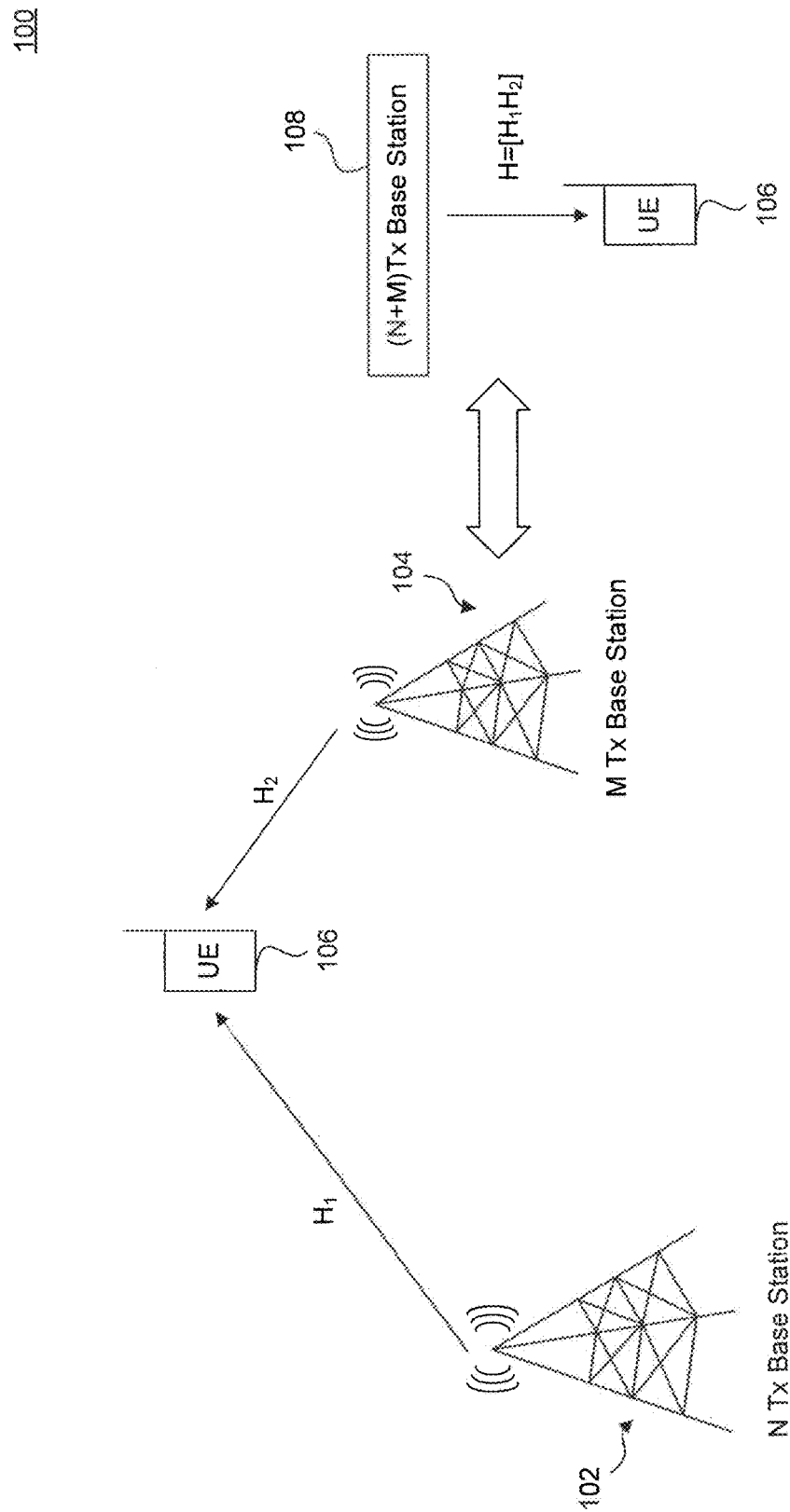
FIG. 1 illustrates an example environment in which embodiments can be implemented or practiced.

FIG. 1 illustrates an example environment 100 in which embodiments can be implemented or practiced. Example environment 100 is provided for the purpose of illustration only and is not limiting of embodiments. As shown in FIG. 1, example environment 100 includes a first base station 102, a second base station 104, and a user equipment (UE) 106. In other embodiments, example environment 100 can include more than two base stations and the example embodiments described herein can be extended to more than two base stations as would be understood by a person of skill in the art based on the teachings herein.

In an embodiment, base station 102 includes N transmit antennas and base station 104 includes M transmit antennas, where N and M are any integers greater than or equal to one. For example, N and M may be both equal to 2, or N may be equal to 4 and M may be equal to 2, etc.

In an embodiment, base stations 102 and 104 can cooperate to serve UE 106. For example, base stations 102 and 104 may use Coordinated Multipoint (CoMP) as described in the Long Term Evolution (LTE) (Release 11) standard to transmit one or more data streams to UE 106. In such an embodiment, UE 106 may receive the same data stream(s) simultaneously from the N transmit antennas of base station 102 and from the M transmit antennas of base station 104. The signals transmitted from base station 102 experience a channel response denoted by a matrix $H_1$ and the signals transmitted from base station 104 experience a channel response denoted by a matrix $H_2$. Accordingly, the joint transmission from base stations 102 and 104 to UE 106 is, as indicated in FIG. 1, equivalent to a transmission from a single base station 108 using N+M transmit antennas over a channel with a channel response $H=[H_1\ H_2]$.

In some embodiments, base stations 102 and 104 may use different transmit powers. For example, base station 102 may be a macrocell and base station 104 may be a picocell, or more generally, base stations 102 and 104 may be any two cells of different types (e.g., macrocell, microcell, picocell, femtocell) that use different transmit powers.

Because of the transparency approach adopted in the Third Generation Partnership Project (3GPP), UE 106 is unaware of the configuration details of the transmit antennas from which it is served. For example, UE 106 is not aware that it can be served by non-collocated base stations and does not know the physical transmit antennas from which it is configured to receive signals. Instead, UE 106 is configured by the network to receive on logical antenna ports that are defined by specific physical resources in time and frequency. For example, referring to example environment 100, UE 106 may be configured to receive on 4 logical antenna ports (e.g., antenna ports 0-3). Each of the 4 logical antenna ports is associated with unique time and frequency resources that are known by or which are signaled during configuration to UE 106. For example, antenna port 0 may correspond to transmissions from a physical antenna located at base station 102, or from more than one physical antenna located at base station 102 and/or base station 104. Yet, UE 106 is not aware of the physical antenna to logical antenna port association.

UE 106's lack of awareness of the configuration details of the transmit antennas also mean that LIE 106 is not aware of the transmit power imbalance that can occur when UE 106 is configured to receive over multiple logical antenna ports using physical antennas with different transmit powers. For instance, in example environment 100, UE 106 may be configured to receive from 4 logical antenna ports, with two logical antenna ports corresponding respectively to two physical antennas of base station 102 and two logical antenna ports corresponding to two physical antennas of base station 104. Further, in addition to being non-collocated, base stations 102 and 104 may be such that they have different transmit powers (e.g., base station 102 may be a macrocell and base station 104 may be a picocell).

The transmit power imbalance between base stations 102 and 104, if not accounted for, can result in suboptimal performance at LTE 106. This is because under the current used approach (including, for example, in single point transmission in Release 10 and in CoMP in Release 11 of the LTE standard) the UE assumes that all logical antenna ports transmit with equal power on average. Using this assumption, the UP computes an estimate of the channel from the logical antenna ports, and uses the channel estimate to select a Precoding Matrix Indicator (PMI) and a Channel Quality Indicator (CQI) (which identify respectively a transmit precoder and a Modulation and Coding Scheme (MCS) to be used by the logical antenna ports in transmitting to the UE). Typically, the UE selects a PMI/CQI combination that maximizes the capacity (e.g., data rate) of the channel (while satisfying a pre-defined error rate). The UE signals the selected PMI and CQI to the network, which adapts the data rate to the UE according to the reported PMI and CQI. This process is known as link adaptation. However, because the UE operates under the incorrect assumption of equal transmit powers, the reported PMI and CQI can be suboptimal, leading, for example, to a suboptimal data rate to the UE.

In the LTE standard, the assumption of equal transmit powers is captured by the network signaling to the UE a scalar "Pc" that indicates a ratio of the transmit powers used for a data bearing channel and a reference signal (typically, the reference signal is transmitted at higher power than the data bearing channel to facilitate channel estimation by the UE). Specifically, Pc is defined as the ratio of the Physical Downlink Shared Channel (PDSCH) Energy Per Resource Element (EPRE) to the Channel State Information-Reference Signal (CSI-RS) EPRE, and is a value in the range of [−8, 15] dB with 1 dB step size. In a multiple logical antenna port configuration, the UE uses respective reference signals associated with the multiple logical antenna ports to estimate the multi-input channel. Then, the UE uses the scalar Pc to scale the estimated channel (e.g., $H'=H*\sqrt{Pc}$) and uses the scaled estimated channel (H') in selecting the PMI and CQI. The uniform scaling of the estimated channel components reflects the assumption of equal transmit powers and results in the above described suboptimality.

Embodiments, as further described below, provide systems and methods for efficient link adaptation in multi-access wireless communication networks, including link adaptation in scenarios with non-collocated and/or power imbalanced base station transmit antennas. In an embodiment, an indication of signal powers of the transmit antennas is signaled by the network to the UE when the UE is configured for logical antenna ports using non-collocated and/or power imbalanced transmit antennas. The UE can use the indication of signal powers in determining the PMI and CQI, resulting in higher accuracy link adaptation. In another embodiment, the UE uses the indication of signal powers to determine and signal a modified transmit precoder to the network. The modified transmit precoder is obtained by modifying a transmit precoder for an existing codebook used by the network.

Figure 2:
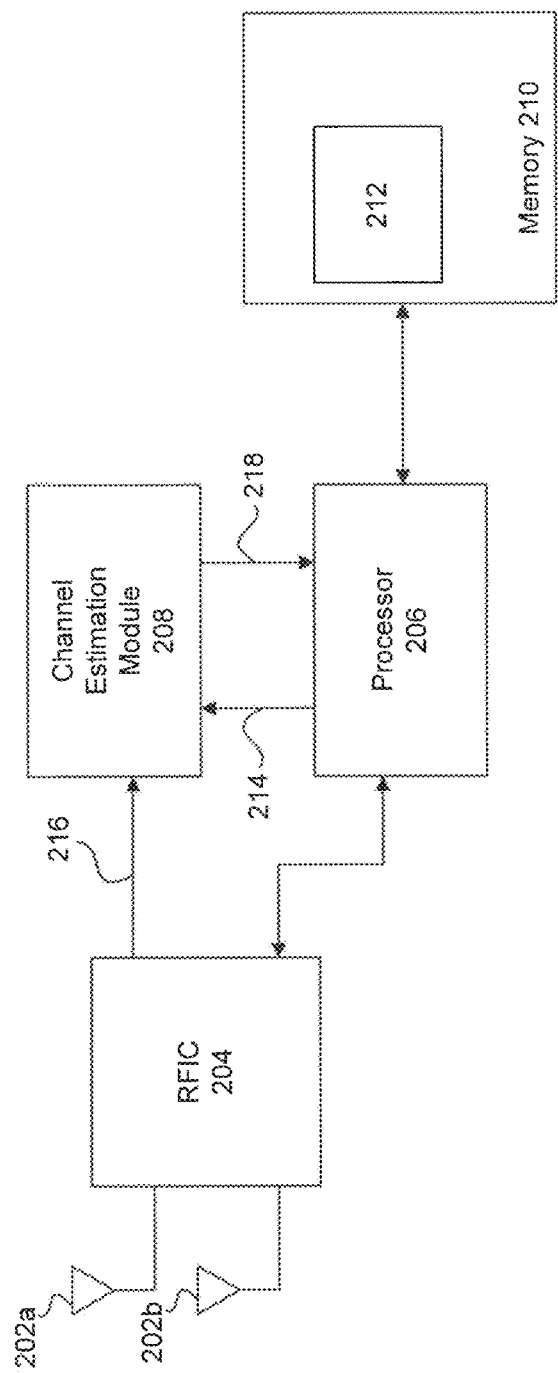
FIG. 2 illustrates an example communication device according to an embodiment.

FIG. 2 illustrates an example communication device 200 according to an embodiment. Example communication device 200 is provided for the purpose of illustration only and is not limiting of embodiments. Example communication device 200 may be an embodiment of UE 106, for example. As such, example communication device 200 can be configured to receive one or more data streams from multiple base station antennas, for example the N transmit antennas of base station 102 and the M transmit antennas of base station 104. In an embodiment, a data stream can be transmitted simultaneously to UE 106 using multiple base station antennas, which can be non-collocated and/or power imbalanced, as described above. For the purpose of illustration only, communication device 200 is described below with respect to an example scenario in which communication device 200 is served by two non-collocated and/or power imbalanced first and second base stations. For the purpose of illustration, it is further assumed that communication device 200 is served by two base station antennas, one at each of the first and second base stations. As would be understood by a person of skill in the art based on the teachings herein, embodiments however encompass scenarios involving more than two base stations as well as more than two base station antennas serving communication device 200. For example, communication device 200 can be served by any number of base stations antennas, which can be all located at the same base station, some located at the same base station, or all located at different base stations.

As shown in FIG. 2, communication device 200 includes, without limitation, a transmitter/receiver comprised of a plurality of antennas 202a-b and a radio frequency integrated circuit (RFIC) 204, a processor 206, a channel estimation module 208, and a memory 210. Memory 210 stores a precoder codebook 212 that includes a plurality of transmit precoders, which can be used by the first and second base station to precode their transmissions to communication device 200. In other embodiments, communication device 200 can have more or less than two antennas.

In an embodiment, the receiver, comprised of antennas 202a-b and RFIC 204, can receive one or more signals corresponding to transmissions from the first and/or second base stations. The receiver may also receive signals corresponding to transmissions from other entities of the network, such as other base stations not currently serving communication device 200. The transmissions can include data, control, and/or pilot information. The signals can be received by antennas 202a-b and then processed by RFIC 204. RFIC 204 may filter, down-convert, and digitize the received signals and then provide the signals in the form of a baseband signal, for example, to processor 206 and/or channel estimation module 208.

In an embodiment, the receiver is configured to receive a signal including an indication of first and second signal powers of the first and second base stations serving communication device 200. In an embodiment, the signal may be transmitted over a control channel, for example, and can be transmitted by the first base station, the second base station, or another entity of the network. For example, the signal can include a Radio Resource Control (RRC) message that includes the indication of the first and second signal powers. The receiver processes the signal and forwards the RRC message to processor 206.

In an embodiment, the first and second signal powers correspond to first and second transmit signal powers of the (antennas of) first and second base stations. In another embodiment, the first and second transmit powers correspond to anticipated first and second transmit signal powers of the first and second base stations. For example, the first and second transmit powers may correspond to transmit powers used or anticipated to be used by the first and second base stations to transmit respective reference signal resources. The respective reference signal resources may correspond to respective Channel State Information-Reference Signal (CSI-RS) resources associated with the first and second base stations.

In another embodiment, the first and second signal powers correspond to respective ratios of transmit signal powers of the first and second base stations. In an embodiment, the first/second signal power is a ratio of transmit powers used by the first/second base station to transmit a data bearing channel and a reference signal. For example, the first and second signal powers can be similar to the Pc scalar described above, but specific to the first and second base stations. The first and second signal powers can be respective ratios of PDSCH EPRE to CSI-RS EPRE for the first and second base stations respectively. In an further embodiment, the first and second signal powers are further relative to the Pc scalar (e.g., normalized by Pc) described above. As described above, the first and second signal powers can be imbalanced, due to the first and second base stations being of different types (e.g., macrocell and picocell), for example.

In another embodiment, the first and second signal powers correspond to first and second expected received signal powers of the first and second base stations at communication device 200. The first and second expected received signal powers can be determined by the network based on an approximate location of communication device 200.

As would be understood by a person of skill in the art based on the teachings herein, signaling of the first and second signal powers from the network to communication device 200 can be performed in many different ways. In an embodiment, the signal power of each of the first and second base stations is encoded and signaled using separate bits (e.g., 3 bits per base station antenna). In another embodiment, the signal powers are differentially encoded with reference to the largest/lowest signal power of the signal powers.

In a further embodiment, the network first signals to communication device 200 antenna configuration details of the base stations serving communication device 200 (for example, the different possible antenna configurations can be indexed and the index corresponding to the current configuration is signaled to communication device 200). The configuration details can include the type (e.g., macrocell, picocell, etc.) of base station antennas serving communication device 200 and whether or not any of them are collocated. In some cases, collocated antennas are associated with the same base station and thus have equal transmit powers. Once the configuration details are known to communication device 200, any equal transmit powers are signaled only once to communication device 200. For example, if communication device 200 is served by two collocated (equal power) macrocell antennas and two collocated (equal power) picocell antennas, then once that antenna configuration is signaled to communication device 200 only two signal powers (one for the macrocell antennas and one for picocell antennas) need to be signaled subsequently to communication device 200.

Returning to FIG. 2, processor 206 is configured to receive the indication of the first and second signal powers of first and second base stations from RFIC 204. In an embodiment, processor 206 retrieves a transmit precoder from codebook 212 stored in memory 210 and modifies the transmit precoder based on the indication of the first and second signal powers to generate a modified transmit precoder. In an embodiment, processor 206 multiplies the transmit precoder by a diagonal matrix to generate the modified transmit precoder, where the diagonal matrix includes as diagonal elements the square roots of the first and second signal powers. For example, if the transmit precoder is denoted by a vector V and the first and second signal powers are denoted by P1 and P2 respectively, then processor 206 generates the product D*V where D is a diagonal matrix with diagonal elements equal to $\sqrt{P1}$ and $\sqrt{P2}$. Processor 206 then provides the modified transmit precoder to channel estimation module 208 by means of an output signal 214.

In an embodiment, processor 206 repeats the above described processing for every transmit precoder available in codebook 212 and provides the respective modified transmit precoder to channel estimation module 208. The modified transmit precoders can be provided to channel estimation module 208 as a batch or sequentially, with a modified transmit precoder provided to channel estimation module 208 after it completes its processing on the previously provided modified transmit precoder.

Channel estimation module 208 is configured to compute an estimate of a channel from the first and second base stations to communication device 200 based at least in part on the indication of first and second signals. In an embodiment, channel estimation module 208 is configured to compute the channel estimate using the modified transmit precoder provided by processor 206. Channel estimation module 208 then provides the computed estimate by means of an output signal 218 to processor 206. In an embodiment, channel estimation module 208 repeats this processing for every transmit precoder of codebook 212, provided by processor 206.

Specifically, in an embodiment, channel estimation module 208 is configured to receive an input signal 216 from RFIC 204 that includes received reference signals transmitted from the first and the second base stations. Using the received reference signals, channel estimation module 208 computes an estimate of the channel from the first and second base stations according to the received signal model Y=H*X+N, where Y denotes the received reference signals, X denotes the transmitted reference signals (which are known to channel estimation module 208), and N represents noise. But to account for the power imbalance between the first and second base stations in estimating the channel, channel estimation module further assumes that X=D*V*s (instead of just V*s), where D*V corresponds to the modified transmit precoder and s denotes a modulated symbol of the transmitted reference signal. It is noted that in case that the power imbalance information is not signaled to communication device 200, channel estimation module 208 can replace the diagonal matrix D with an identity matrix I to revert to normal processing to compute the estimate of the channel.

In an embodiment, processor 206 receives an estimate of the channel from the first and second base stations to communication device 200 for every modified transmit precoder. Based on each estimate of the channel, processor 206 determines a Channel Quality Indicator (CQI) of the channel (e.g., the CQI that results in a maximum data rate based on the estimate). Processor 206 then selects the modified transmit precoder and CQI combination that correspond to a desired throughput of the channel (e.g., maximum data rate) and signals the CO and an PMI identifying the modified transmit precoder to the network (e.g., at least one of the first and second base stations) via the transmitter.

Figure 3:
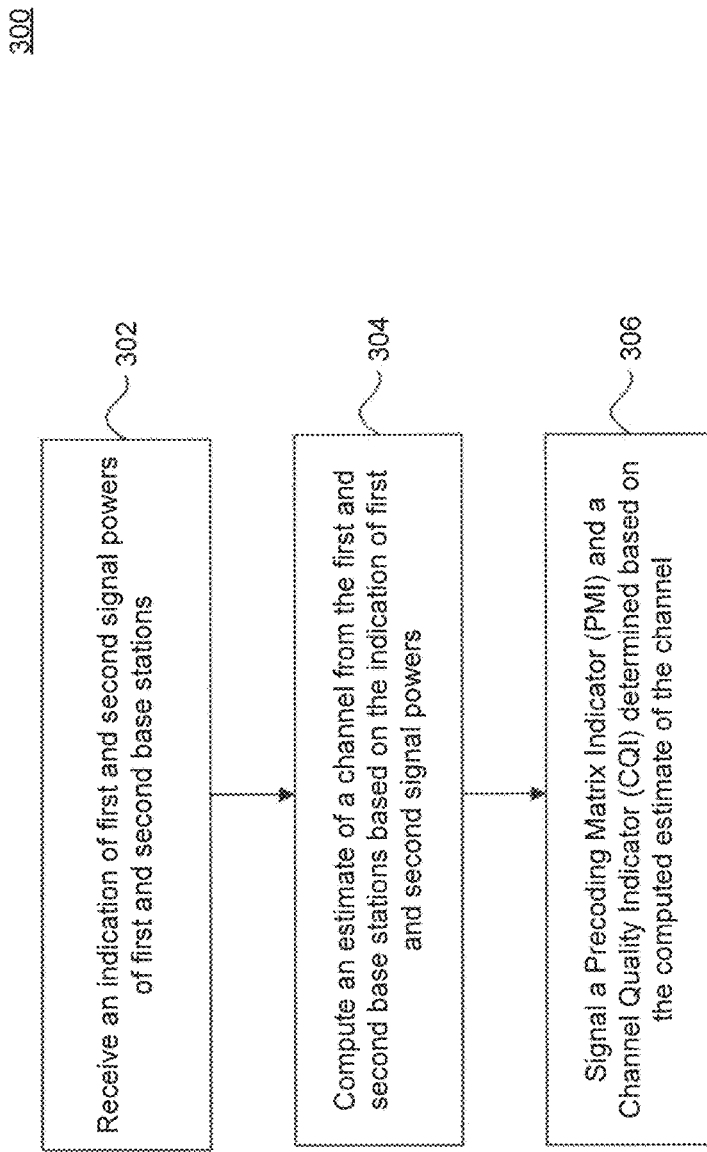
FIG. 3 illustrates an example process according to an embodiment.

FIG. 3 illustrates an example process 300 according to an embodiment. Example process 300 is provided for the purpose of illustration only and is not limiting of embodiments. Example process 300 can be performed by a UE, such as UE 106, embodied, for example, by communication device 200. Example process 300 can be performed by a UE being served simultaneously by multiple base station antennas that are power imbalanced. The multiple base station antennas may or may not be collocated. More specifically, process 300 can be performed by the UE to assist the network in performing a link adaptation process that accounts for the power imbalance between the multiple base station antennas serving the UE. For the purpose of illustration only, example process 300 describes a scenario in which the UE is served by two base station antennas, one at each of first and second base stations. However, as would be understood by a person of skill in the art based on the teachings, example process 300 can be readily extended to any number of base stations antennas serving the UE.

As shown in FIG. 3, process 300 begins in step 302, which includes receiving an indication of first and second signals powers of the first and second base stations. As described above, the indication of the first and second signal powers may be signaled to the UE in a RRC message transmitted by the network over a control channel. The first and second signal powers provide an indication to the UE of the power imbalance between the first and second base stations and can take various forms as described above, including actual transmit signal powers, relative transmit signal powers, or expected received signal powers. In an embodiment, the first and second signal powers are associated with respective reference signals transmitted by the first and second base stations. The transmitted respective reference signals are received by the UE as received respective reference signals.

Subsequently, in step 304, process 300 includes computing an estimate of a channel from the first and second base stations to the UE based on the indication of the first and second signal powers. In an embodiment, step 304 further includes computing the estimate of the channel based on the transmitted respective reference signals and the received respective reference signals. The computation of the estimate accounts for the power imbalance between the first and second base stations by weighing the transmitted reference signals according to the indication of the first and second signal powers in the computation. In an embodiment, the estimate of the channel is computed based on a hypothesis of a transmit precoder being used by the first and second base stations. In another embodiment, the transmit precoder is modified according to the indication of the first and second signal powers to generate a modified transmit precoder, which is used in the computation of the estimate of the channel.

Process 300 terminates in step 306, which includes determining and signaling a PMI and a CQI to the network determined based on the computed estimate of the channel. In an embodiment, step 306 is performed when the CQI corresponds to a desired throughput (e.g., maximum data rate) of the channel. In another embodiment, step 306 further includes selecting the CQI from a plurality of available CQIs, where the selected CQI corresponds to the desired throughput based on the computed estimate of the channel. In an embodiment, the signaled PMI corresponds to modified transmit precoder based on which the estimate of the channel is computed.

Figure 4:
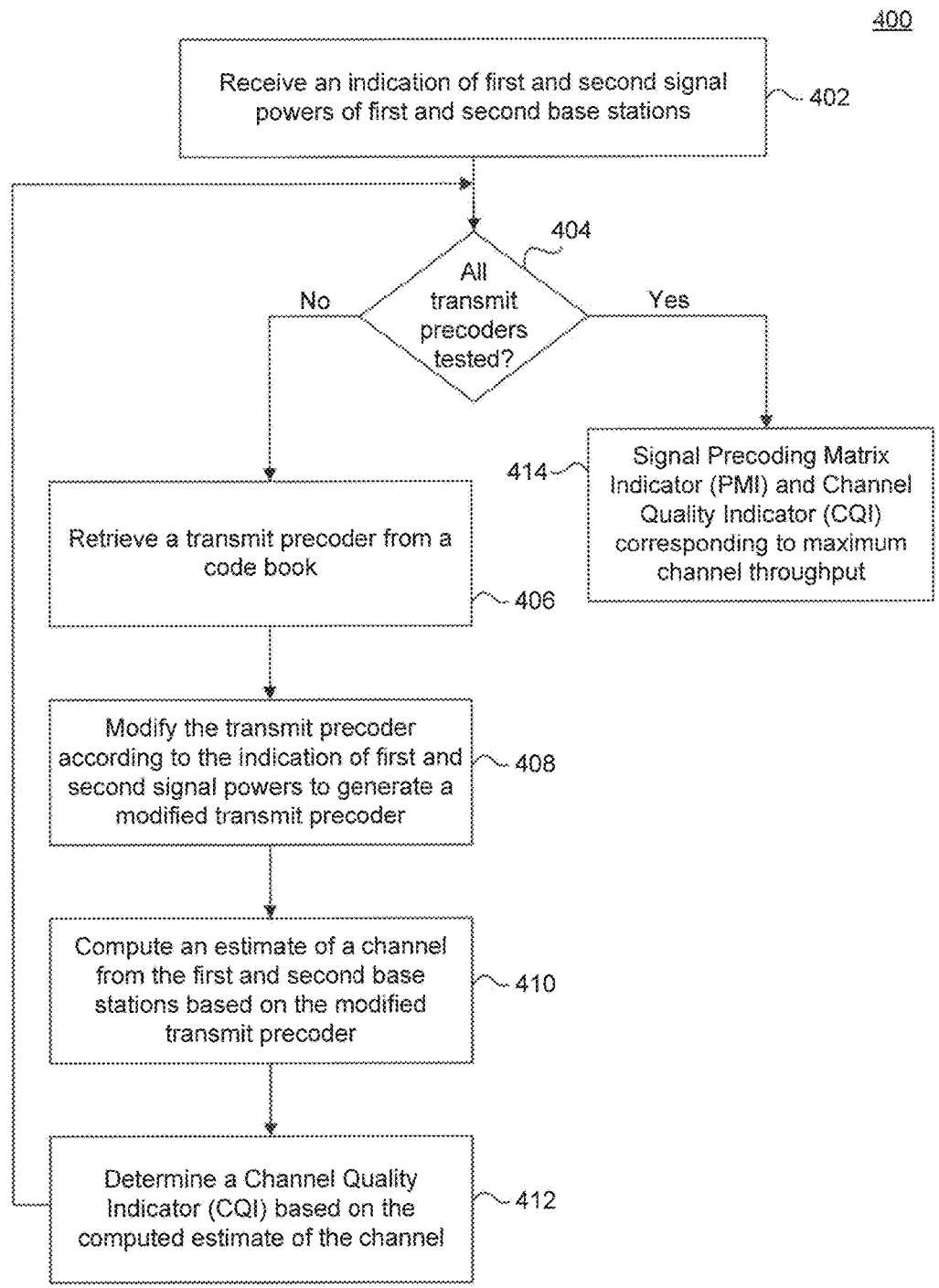
FIG. 4 illustrates another example process according to an embodiment.

FIG. 4 illustrates another example process 400 according to an embodiment. Example process 400 is provided for the purpose of illustration only and is not limiting of embodiments. Example process 400 can be performed by a UE, such as UE 106, embodied, for example, by communication device 200. Example process 400 can be performed by a UE being served simultaneously by multiple base station antennas that are power imbalanced. The multiple base station antennas may or may not be collocated. More specifically, process 400 can be performed by the UE to assist the network in performing a link adaptation process that accounts for the power imbalance between the multiple base station antennas serving the UE. For the purpose of illustration only, example process 400 describes a scenario in which the UE is served by two base station antennas, one at each of first and second base stations. However, as would be understood by a person of skill in the art based on the teachings, example process 400 can be readily extended to any number of base stations antennas serving the UE.

As shown in FIG. 4, process 400 begins in step 402, which includes receiving an indication of first and second signal powers of the first and second base stations. This step can be similar to step 302 of example process 300 described above.

Subsequently, in step 404, process 400 includes determining whether all transmit precoders of a codebook have been tested. In an embodiment, the codebook includes a plurality of transmit precoders which are identified by respective indices. The UE can signal a transmit precoder from the codebook to the network, or vice versa, by signaling its corresponding index.

If not all transmit precoders of the codebook have been tested, process 400 proceeds from step 404 to step 406, which includes retrieving a transmit precoder that has not yet been tested from the codebook. Then, step 408 includes modifying the retrieved transmit precoder according to the indication of first and second powers to generate a modified transmit precoder. In an embodiment, step 408 further includes multiplying the retrieved transmit precoder by a diagonal matrix to generate the modified transmit precoder, where the diagonal matrix includes as diagonal elements the square roots of the first and second signal powers. Next, in step 410, process 400 includes computing an estimate of a channel from the first and second base stations to the UE based on the modified transmit precoder; and in step 412, includes determining a CQI based on the computed estimate of the channel. The CQI identifies a Modulation and Coding Scheme (MCS) to be used by the first and second base stations in transmitting to the UE. In an embodiment, the identified CQI is selected to provide a desired throughput (e.g., maximum data rate) to the UE based on the modified transmit precoder. Process 400 then returns to step 404, which is described above.

Returning to step 404, if all transmit precoders of the codebook have been tested, process 400 proceeds to step 414, which includes signaling a PMI and a CQI corresponding to a maximum channel throughput at the UE to at least one of the first and second base stations. The PMI may identify the modified transmit precoder (or the unmodified transmit precoder) that corresponds to the CQI that results in the desired (e.g., maximum) channel throughput.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments as other embodiments will be apparent to a person of skill in the art based on the teachings herein.

What is claimed is:

1. A communication device, comprising:
 a processor configured to receive an indication of a first signal power of a first base station and a second signal power of a second base station; and
 a channel estimation module, implemented at least in part in circuitry, configured to compute an estimate of a channel from the first and second base stations based at least in part on a transmit precoder scaled according to the indication of the first signal power and the indication of the second signal power.

2. The communication device of claim 1, further comprising:
 a receiver configured to receive a Radio Resource Control (RRC) message comprising the indication of the first signal power and the indication of the second signal power and to forward the RRC message to the processor.

3. The communication device of claim 1, wherein the first and second signal powers correspond to first and second transmit signal powers of the first and second base stations.

4. The communication device of claim 3, wherein the first and second transmit signal powers correspond to anticipated first and second transmit signal powers of the first and second base stations on respective reference signal resources of the first and second base stations.

5. The communication device of claim 4, wherein the respective reference signal resources correspond to respective Channel State Information-Reference Signal (CSI-RS) resources associated with the first and second base stations.

6. The communication device of claim 1, wherein the first and second signal powers are imbalanced.

7. The communication device of claim 1, wherein each of the first and second signal powers corresponds to a respective ratio of transmit signal powers of a data bearing channel and a reference signal.

8. The communication device of claim 1, further comprising:
 a memory configured to store a codebook comprising the transmit precoder,
 wherein the processor is configured to modify the transmit precoder according to the indication of the first signal power and the indication of the second signal power to generate a modified transmit precoder.

9. The communication device of claim 8, wherein the processor is further configured to signal a Precoding Matrix Indicator (PMI) identifying the modified transmit precoder to at least one of the first and second base stations.

10. The communication device of claim 8, wherein the processor is further configured to determine a Channel Quality Indicator (CQI) of the channel based on the estimate.

11. The communication device of claim 10, wherein the determined CQI corresponds to a desired throughput of the channel, and wherein the processor is further configured to signal a Precoding Matrix Indicator (PMI) identifying the modified transmit precoder and the determined CQI to at least one of the first and second base stations.

12. The communication device of claim 1, wherein the first and second base stations are non-collocated.

13. A method, comprising:
 receiving an indication of a first signal power of a first base station and a second signal power of a second base station;
 scaling a transmit precoder according to the indication of the first signal power and the indication of the second signal power to generate a modified transmit precoder; and
 computing an estimate of a channel from the first and second base stations based on the modified transmit precoder.

14. The method of claim 13, further comprising:
 retrieving the transmit precoder from a codebook; and
 multiplying the transmit precoder by a diagonal matrix to generate the modified transmit precoder, wherein the diagonal matrix includes as diagonal elements the square roots of the first and second signal powers.

15. The method of claim 13, further comprising:
 determining a Channel Quality Indicator (CQI) based on the computed estimate of the channel.

16. The method of claim 15, wherein the determined CQI corresponds to a desired throughput of the channel, further comprising:
 signaling a Precoding Matrix Indicator (PMI) identifying the modified transmit precoder and the determined CQI to at least one of the first and second base stations.

17. The method of claim 13, wherein the first and second signal powers correspond to first and second transmit signal powers of the first and second base stations.

18. A communication device, comprising:
 a processor configured to receive an indication of a first signal power of a first base station and a second signal power of a second base station, and to scale a transmit precoder according to the indication of the first signal power and the indication of the second signal power to generate a modified transmit precoder; and
 a channel estimation module, implemented at least in part in circuitry, configured to compute an estimate of a channel from the first and second base stations based on the modified transmit precoder.

19. The communication device of claim 18, wherein the processor is further configured to:
 retrieve the transmit precoder from a codebook; and
 multiply the transmit precoder by a diagonal matrix to generate the modified transmit precoder, wherein the diagonal matrix includes as diagonal elements the square roots of the first and second signal powers.

20. The communication device of claim 18, wherein the processor is further configured to:
 determine a Channel Quality Indicator (CQI) based on the computed estimate of the channel; and
 if the determined CQI corresponds to a desired throughput of the channel, signal a Precoding Matrix Indicator (PMI) identifying the modified transmit precoder and the determined CQI to at least one of the first and second base stations.

* * * * *